United States Patent
Foster et al.

(10) Patent No.: US 6,182,104 B1
(45) Date of Patent: Jan. 30, 2001

(54) CIRCUIT AND METHOD OF MODULO MULTIPLICATION

(75) Inventors: Robert I. Foster, Mesa; John Michael Buss, Tempe; Rodney C. Tesch, Phoenix; James Douglas Dworkin; Michael J. Torla, both of Chandler, all of AZ (US)

(73) Assignee: Motorola, Inc., Schaumburg, IL (US)

( * ) Notice: Under 35 U.S.C. 154(b), the term of this patent shall be extended for 0 days.

(21) Appl. No.: 09/120,835

(22) Filed: Jul. 22, 1998

(51) Int. Cl.[7] .................................................... G06F 7/38
(52) U.S. Cl. ........................ 708/501; 380/28; 708/505; 708/523
(58) Field of Search ................... 380/28, 287; 713/200, 713/154; 708/200, 277, 490, 501, 505, 523, 524, 606, 627, 802, 808

(56) References Cited

U.S. PATENT DOCUMENTS

| | | | |
|---|---|---|---|
| 4,658,094 | * 4/1987 | Clark | 380/28 |
| 5,513,133 | * 4/1996 | Cressel et al. | 364/754 |
| 5,675,527 | * 10/1997 | Yano | 364/760 |
| 5,764,554 | * 6/1998 | Monier | 364/746 |
| 5,784,305 | * 7/1998 | Nadehara | 364/736.02 |
| 5,870,478 | * 2/1999 | Kawamura | 380/30 |

* cited by examiner

Primary Examiner—Tod R. Swann
Assistant Examiner—Paul E. Callahan
(74) Attorney, Agent, or Firm—Lanny L. Parker

(57) ABSTRACT

A co-processor (44) executes a mathematical algorithm that computes modular exponentiation equations for encrypting or decrypting data. A pipelined multiplier (56) receives sixteen bit data values stored in an A/B RAM (72) and generates a partial product. The generated partial product is summed in a summer (58) with a previous partial product stored in a product RAM (64). A modulo reducer (60) causes a binary data value N to be aligned and added to the summed value when a particular data bit location of the summed value has a logic one value. An N RAM (70) stores the data value N that is added in a modulo reducer (60) to the summed value. The co-processor (44) computes the Foster-Montgomery Reduction Algorithm and reduces the value of (A*B mod N) without having to first compute the value of $\mu$ as is required in the Montgomery Reduction Algorithm.

18 Claims, 5 Drawing Sheets

US 6,182,104 B1

CIRCUIT AND METHOD OF MODULO MULTIPLICATION

BACKGROUND OF THE INVENTION

The present invention relates, in general, to multipliers and, more particularly, to a cryptographic multiplier.

Rivest-Shamir-Adleman (RSA) is a widely used cryptographic algorithm that provides high security for digital data transfers between electronic devices. The modular exponentiation mathematics of the RSA algorithm can be efficiently computed using Montgomery's method for modular reduction based on a hardware multiplier. Modular exponentiation of large integers can be efficiently computed with repeated modular multiplications and the efficiency of the overall RSA computation is directly related to the speed of the multiplier. Hardware multiplier architectures use pipelining techniques for the massive parallel computations of the Montgomery algorithm. A pipelined hardware multiplier computing the Montgomery algorithm can provide speed and silicon area tradeoffs that provide both a high performance and a cost effective solution. In addition, the pipelined integer modular multiplier offers lower power which is required for many applications.

The cryptosystem facilitated by the RSA algorithm offers a high level of security but is expensive to implement. Although the mathematics of the RSA algorithm with modular exponentiation are straight forward, efficient hardware implementation is not straight forward. With increasing demand for faster cryptographic operations and higher performance, hardware modular multiplier architecture improvements are needed to ensure high levels of security.

Accordingly, it would be advantageous to have a modular exponentiation and multiplication system that achieves high performance, low cost, and low-power for implementation in an integrated circuit. A need exists for a multiplication system that achieves high performance by computing the Montgomery algorithm in fewer clock cycles than in prior art systems. A further need exists for a multiplication system that is adaptable to operands having an increased number of bits.

DETAILED DESCRIPTION OF THE PREFERRED EMBODIMENT

Figure 1:
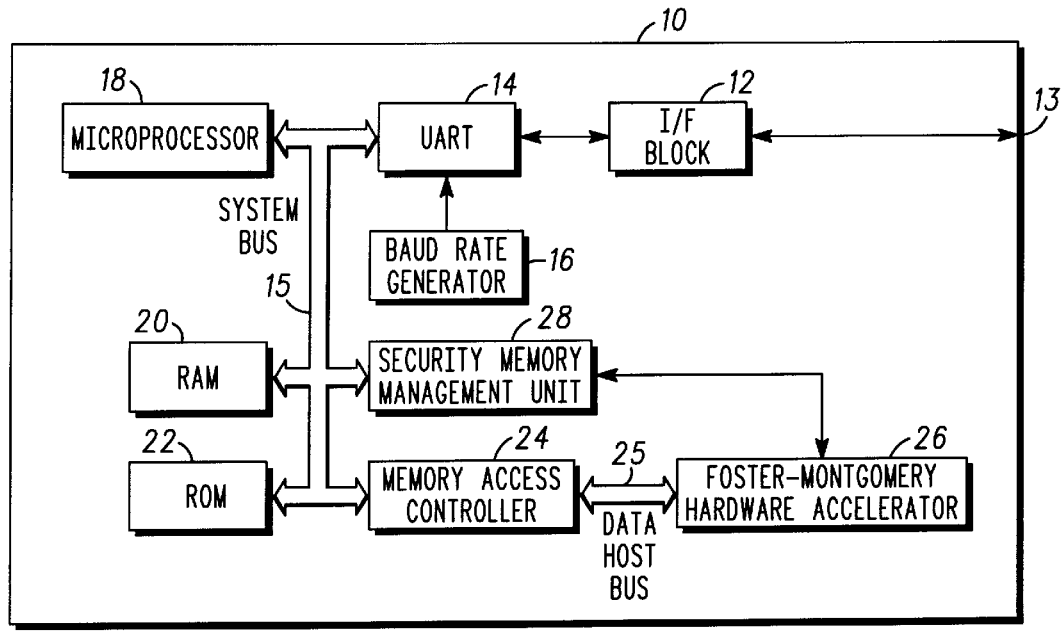
FIG. 1 is a block diagram of a smartcard that includes a Foster-Montgomery Hardware Accelerator (FMHA) block.

FIG. 1 illustrates a block diagram of a smartcard 10 that is configured to operate in a data communication network. In a "contacted" smartcard configuration, smartcard 10 includes an interface (I/F) block 12 connected to a number of contact points 13. Contact points 13 allow the transfer of electrical signals between a terminal device (not shown) and smartcard 10. Smartcard 10 receives an operating potential from the terminal device through one of the contact points 13 for supplying energy to the functional blocks within smartcard 10. Additional contact points 13 are used to transfer Input/Output (I/O) signals between smartcard 10 and the terminal device.

Alternatively, smartcard 10 can be a "contact-less" smartcard that operates without making physical contact with the terminal device. In this case, smartcard 10 both receives input signals and transmits modulated output signals over a carrier frequency. For instance, Radio Frequency (RF) energy is radiated to a coil (not shown) within smartcard 10 and the coil supplies the operating potential that enables operation of the functional blocks within smartcard 10.

In addition to I/F block 12 that receives and transmits data from/to an external terminal device, smartcard 10 includes a Universal Asynchronous Receiver-Transmitter device (UART) 14. UART 14 provides an interface between a microprocessor 18 and the terminal device. The interface block, i.e., UART 14, receives an adjustable clock signal from baud rate generator 16 that dynamically moves data through UART 14. A SYSTEM BUS 15 commonly connects microprocessor 18 with other functional blocks such as UART 14, a Random Access Memory (RAM) 20, a Read Only Memory (ROM) 22, a Memory Access Controller (MAC) 24, and a Secure Memory Management Unit (SMMU) 28. Data received from UART 14 is stored in RAM 20 and a portion of RAM 20 is nonvolatile and retains information when smartcard 10 is not receiving an operating potential. Examples of nonvolatile memory include an Electrically Erasable ($E^2$) memory or a ferroelectric memory, among others. ROM 22 provides data for the operating system of smartcard 10 and instructions via the SYSTEM BUS for the program control of microprocessor 18. Data from RAM 20 is transferred through MAC 24 to a Foster-Montgomery Hardware Accelerator (FMHA) 26 where mathematical operations are performed to encrypt the data. FMHA 26 is also referred to as a Modular Arithmetic Unit (MAU) or a cryptographic accelerator block. The encrypted data is transferred from FMHA 26 via SYSTEM BUS 15 to UART 14 and the terminal device.

It should be noted that smartcard 10 as illustrated in FIG. 1 is in a simplified form. It should be further noted that smartcard 10 is a computer chip embedded inside a plastic credit card that operates either in the "contacted" or "contact-less" mode. Additional blocks such as a serial communication interface block, a watch dog timer, an interval timer, an interrupt controller, among others, may be added as functional blocks to smartcard 10.

In operation, smartcard 10 establishes a secure communication link for data transmitted between smartcard 10 and the terminal device. Under the control of microprocessor 18, SMMU 28, MAC 24, and FMHA 26 cooperate to execute mathematical algorithms that compute modular exponentiation equations for encrypting portions of the data stored in RAM 20 using cryptographic keys and other information. By way of example, RAM 20 stores data such as personal health records, financial records, and personal authentication identifiers, i.e., finger prints and retina eye prints. The personal data is transferred from RAM 20 via SYSTEM BUS 15 to MAC 24 and from MAC 24 via a DATA HOST BUS 25 to FMHA 26. FMHA 26 encrypts the data received on DATA HOST BUS 25 using functions that include modular multiplication, addition, subtraction, and exponentiation. Following data encryption, the encrypted personal data is transferred from FMHA 26 to UART 14 and I/F block 12. The encrypted personal data is radiated through RF signals in the contact-less smartcard and through a set of I/O pins in the contacted smartcard to the terminal device.

Figure 2:
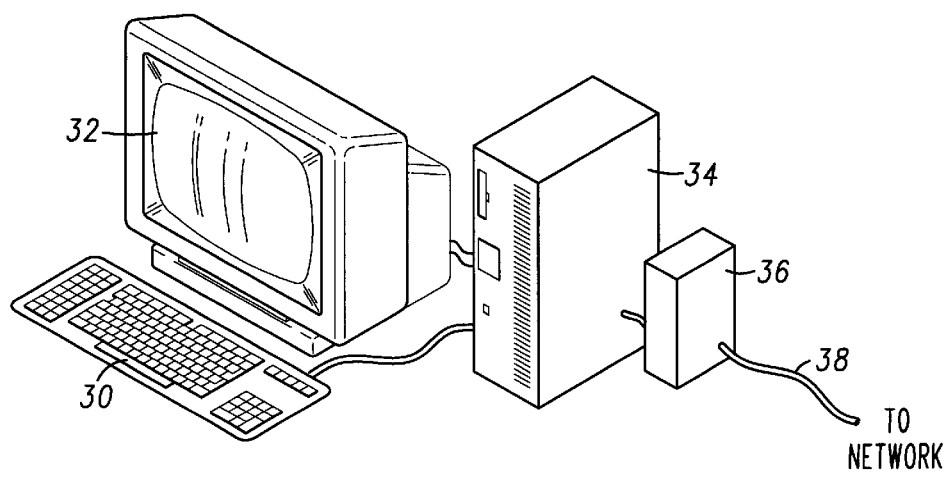
FIG. 2 is a diagram illustrating data being transferred over the internet from an integrated circuit that includes the FMHA block.

FIG. 2 is a diagram illustrating data being transferred via the internet to/from an integrated circuit that includes the FMHA block. A keyboard 30 provides a user with an interface for data entry to a Central Processor Unit (CPU) 34. Monitor 32 allows the user to visually display the data stored in CPU 34. An integrated circuit 36 includes cryptographic circuitry that executes the Foster-Montgomery algorithm. Data stored in CPU 34 is transferred via a data bus to integrated circuit 36, encrypted, and the cryptic data is transferred to internet 38. Also, data received via internet 38 can be transmitted to integrated circuit 36 and decrypted. Thus, FIG. 2 illustrates a cryptographic system for interfacing to a communications network such as the internet.

Figure 3:
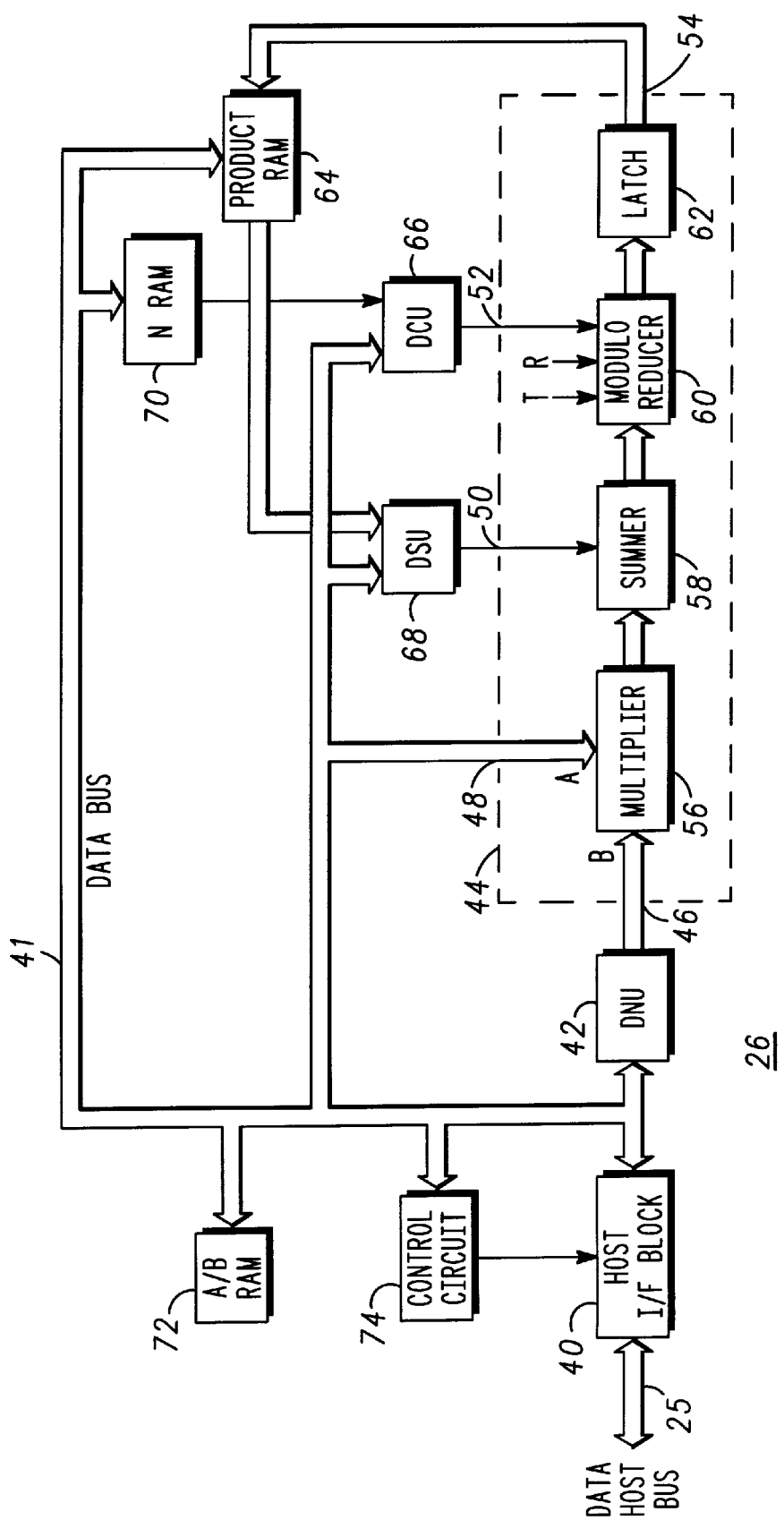
FIG. 3 is a block diagram that illustrates the functional blocks included in the FMHA block of FIG. 1.

FIG. 3 is a block diagram that illustrates the functional blocks included in FMHA 26 of FIG. 1. It should be noted that the same reference numbers are used in the figures to denote the same elements. It should be further noted that the Foster-Montgomery algorithm forms a product of operands A and B, where both operands A and B are large integer numbers such as 1024 bit numbers. The pipelining techniques used by FMHA 26 allow operands A and B to be segmented into multiple, ordered 16 bit numbers that are referred to as digits. Sixteen bits of data have been included into the digit but this is not a limitation of the present invention. Further, each segmented number in the set of numbers for operand A is referred to as a value A. Likewise, each segmented number in the set of numbers for operand B is referred to as a value B. Examples of values A are $A_0, \ldots, A_{63}$, and examples of values B are $B_0, B_1, \ldots, B_{63}$. A host interface (I/F) block 40 receives values A and values B from RAM 20 via DATA HOST BUS 25 (FIG. 1). The values A and B are stored in an A/B Random Access Memory (RAM) 72. In addition, host I/F block 40 receives control signals from the host processor, i.e., microprocessor 18 (FIG. 1), that are translated to host control signals by a control circuit 74 for controlling the transfer of data within FMHA 26.

Control circuit 74 has a terminal that is connected via a bus, referred to as a DATA BUS 41, to the output of Host I/F block 40. Control circuit 74 receives the control signals from the host processor and generates signals that control interaction between host I/F block 40 and other blocks within FMHA 26.

A Digit Negation Unit (DNU) 42 has an input connected via DATA BUS 41 to an output of host I/F block 40. A value B is received from A/B RAM 72 on DATA BUS 41 at the input of DNU 42 and is either transferred to a terminal 46 of co-processor 44 or converted by DNU 42 to a 1's complement negative number and transferred to terminal 46. In addition, co-processor 44 has a terminal 48 connected to DATA BUS 41 for receiving a value A from A/B RAM 72. Terminals 50 and 52 of co-processor 44 are coupled for receiving a partial product value and a value N, respectively. Operand N is the modulus for all of the arithmetic and defines the finite field over which the mathematics are valid. The range of possible numbers is thereby limited by the modulus.

Co-processor 44 computes the Foster-Montgomery Modular Reduction Algorithm. Co-processor 44 includes a multiplier 56 having a first input connected to terminal 46 and a second input connected to terminal 48. A summer circuit or adder 58 has a first input connected to an output of multiplier 56 and a second input connected to terminal 50 of co-processor 44. A modulo reducer 60 has a first input connected to an output of adder 58 and a second input connected to terminal 52 of co-processor 44. A latch 62 has an input connected to an output of modulo reducer 60 and an output connected to terminal 54 of co-processor 44. Latch 62 may not be necessary for some embodiments of co-processor 44 and latches may or may not be included at inputs at terminals 46, 48, 50, 52, etc.

An output terminal of co-processor 44 is connected to an input of a product RAM 64. Product RAM 64 provides temporary storage for intermediate data values generated by co-processor 44. By way of example, product RAM 64 includes two separate RAMs, i.e., an even memory and an odd memory, that allow dual-access in a single cycle. For instance, during one cycle the even memory supplies data needed during the next calculation involving co-processor 44 while the odd memory stores data generated by co-processor 44 from the previous calculation. On the next cycle the odd memory supplies data needed during the next calculation involving co-processor 44 while the even memory stores data generated by co-processor 44 from the previous calculation. Thus, the even and odd memories alternate every cycle being in the read mode and the write mode and the memories are not both in the read mode or the write mode in the same cycle. Both the even memory and the odd memory of product RAM 64 are organized into 32 rows, each row storing 16 bits of data (a digit). Alternatively, product RAM 64 could be a dual-port RAM.

An output of product RAM 64 is connected to a first input of a Data Switch Unit (DSU) 68. The second input of DSU 68 is connected to DATA BUS 41. An output of DSU 68 is connected to terminal 50 of co-processor 44. Thus, either data from DATA BUS 41 or data from product RAM 64 is selected within DSU 68 as the partial product value and transferred to terminal 50 of co-processor 44. In addition, data from product RAM 64 can also be transferred to DATA BUS 41.

An N RAM 70 has an input connected to DATA BUS 41 for receiving the modulus value for the number system used by co-processor 44. N RAM 70 is organized, for example, into 64 rows where each row stores 16 bits of data. An output of N RAM 70 is connected to a first input of a Digit Compare Unit (DCU) 66. The second input of DCU 66 is connected to DATA BUS 41. An output of DCU 66 is connected to terminal 52 of co-processor 44. Thus, either data from DATA BUS 41 or data from N RAM 70 is selected within DCU 66 as the value N and transferred to terminal 52 of co-processor 44. In addition, data can be transferred from N RAM 70 to DATA BUS 41 via DCU 66.

An A/B RAM 72 having an A section and a B section is connected to DATA BUS 41 and receives source operands for mathematical operations. By way of example, A/B RAM 72 stores in the A section all of the digits for a first operand having 1024 bits, i.e., the 64 digits of value A for segmented operand A. Likewise, A/B RAM 72 stores in the B section all of the digits for a second operand having 1024 bits, i.e., the 64 digits of value B for segmented operand B. Thus, A/B RAM 72 stores 64 digits for value A that are transferred to terminal 48 of co-processor 44 and 64 digits for value B that are transferred to the input of DNU 42. Alternatively, A/B RAM 72 could be two separate memories, one for storing operand A and the other for storing operand B. In addition, in the present embodiment the B section of A/B RAM 72 stores the final product of a multiplication of operands A and B after the encryption operation is finished. The output of product RAM 64 is transferred to DATA BUS 41 in DSU 68 when the final product has been computed. Host I/F block 40 can transfer the final product, i.e., encrypted data, stored in the B section of A/B RAM 72 to DATA HOST BUS 25.

FMHA 26 performs a multiplication of operands A and B for encryption and decryption. Operands A and B can be numerical data or plain text strings that are converted to ordinal numbers using American Standard Code for Information Interchange (ASCII) or other transformed character sets. FMHA 26 treats the data as a binary integer whole number. The Montgomery Reduction Algorithm for modular multiplication takes the form of:

$$(A*R \bmod N)(B*R \bmod N) + \mu*N$$

where:

A is the first operand and an integer;

B is the second operand and an integer;

N is an integer having an odd value;

mod N is a remainder value of $(A*B*R)/N$ that defines the number of elements in the finite field;

R is an integer power of two number having a value greater than the value of N; and $\mu$ is a reduction value that is computed such that $(A*R \bmod N)(B*R \bmod N) + \mu*N$ is an integer that can be divided by R without a loss of significant bits.

In one example using the concepts of FMHA 26, two 1024 bit operands are multiplied using pipelining techniques and multiple passes or rotations through co-processor 44 where two 16 bit binary numbers are multiplied by multiplier 56. However, it should be noted that the present invention is neither limited to operands of 1024 bits nor a hardware multiplier that multiplies two 16 bit binary numbers. For simplicity and illustrative purposes the Foster-Montgomery Modular Reduction Algorithm is described using the following example that multiplies two small numbers. It should be noted that the Montgomery Method converts operands A and B into Montgomery form by pre-multiplying the operands A and B by R to simplify the hardware modular reduction problem.

Using base two numbers the term $(A*R \bmod N)$ has the value of 0001 when $A_{10}=9$, $R_{10}=16$, and $N_{10}=13$. Further, the term $(B*R \bmod N)$ has the value or 0111 when $B_{10}=11$, $R_{10}=16$, and $N_{10}=13$. In the following example the Foster-Montgomery Reduction Algorithm is used in the multiplication of $(A*R \bmod N)$, i.e., (0001), and $(B*R \bmod N)$, i.e., (0111).

Multiplier 56 multiplies two data values and the product of those data values is transferred to adder 58. Adder 58 generates a summed value of a previous partial product and the generated product from multiplier 56. In the Foster-Montgomery Reduction Algorithm the logic value of a particular bit location of the summed value determines whether the summed value should be reduced. Initially, the particular bit location is the right most bit location, i.e., the least significant data bit of the first summed value. Following the multiplication of a first data value by the value in a bit location of the second data value, i.e., a bit multiply, the particular bit location is moved one bit location to the left. Thus, with the generation of each bit multiply, the particular bit location in the summed value is moved one bit location to the left, i.e., from the least significant bit location toward the most signification bit location.

In the Foster-Montgomery Reduction Algorithm, when the logic value of the data bit in the particular bit location has a logic one value, then the value of N is aligned to that particular bit location by a shift operation and added to that summed value. By checking the logic value at the particular bit location after each bit multiply and appropriately aligning and adding the value of N, each partial product generated at the output of co-processor 44 is appropriately reduced on each rotation through co-processor 44. On the other hand, the value of N is not added to the summed value when the logic value of the data bit in the particular bit location has a logic zero value. A logic zero value implies that the value at the particular bit position is already reduced and that particular multiple of N is not a component of $\mu$.

In this example, multiplier 56 generates a product of the value $(A*R \bmod N)$, i.e., (0001), and the value $(B*R \bmod N)$, i.e., (0111). The first bit multiply is generated by multiplying the value (0001) by the least significant bit of (0111), i.e., a logic one value. Following each multiplication that generates a bit multiply, that result is summed with a stored partial product. It should be noted that the stored partial product is initially zero and therefore the first summed value and the bit multiply have equivalent values.

| (1) |   | 0001 | <== | an initial value, $(A*R \bmod N)$ |
|---|---|---|---|---|
| (2) | × | 0001 | <== | least significant bit of $(B*R \bmod N)$ |
| (3) |   | 0001 | <== | first bit multiply |

Using the Foster-Montgomery Reduction Algorithm the logic value of the data in the particular bit location of the summed value determines whether the value of N should be added to the summed value to reduce the partial product being generated. In this example the least significant bit of the first bit multiply (000<u>1</u>) has a logic one value and accordingly, the value of N (4) is added to the first bit multiply (3).

| (3) |   | 0001 | <== | product of the first bit multiply |
|---|---|---|---|---|
| (4) | + | 1101 | <== | the value of N |
| (5) |   | 1110 | <== | result after the first bit reduction |

The second bit multiply involves the multiplication of (1) by the second bit from the right (01<u>1</u>1) of $(B*R \bmod N)$.

| (1) |   | 0001 | <== | initial value |
|---|---|---|---|---|
| (6) | × | 00<u>1</u>0 | <== | second bit from the right of $(B*R \bmod N)$ |
| (7) |   | 0010 | <== | product of the second bit multiply |

The product of second bit multiply (7) is summed with the stored previous result (5) to generate the second summed value (8).

| (7) |   | 0010 | <== | product of second bit multiply |
|---|---|---|---|---|
| (5) | + | 1110 | <== | result after first bit reduction |
| (8) |   | 10000 | <== | second summed value |

Again, in the Foster-Montgomery Reduction Algorithm the logic value of the particular bit location of the second summed value determines whether the second summed value should be reduced. In this case, the particular bit location is the location just to the left of the least significant data bit (100_0_0). The second data bit has a logic zero value and accordingly, the value of N is not added to the second summed value. In other words, the second summed value is already reduced and requires no addition of a shifted N value.

The third bit multiply involves the multiplication of (1) by the logic value located in the third bit location (0_1_11) from the right in (B*R mod N).

| (1)  |   | 0001 | <== | initial value |
| (9)  | × | 000_1_ | <== | third bit location from the right of (B*R mod N) |
| (10) |   | 0100 | <== | product of the third bit multiply |

Following the third bit multiply, the product of the third bit multiply (10) is added to the previous result (8) to provide the third summed value (11).

| (10) |   | 0100  | <== | product of the third bit multiply |
| (8)  | + | 10000 | <== | previous result |
| (11) |   | 010100 | <== | third summed value |

After adding the product of the third bit multiply (10) with the previous result (8), the logic value of the particular bit location of the third summed value determines whether the third summed value should be reduced. In this example, the particular bit location is the third bit location from the right (010_1_00). When the particular bit location of the third summed value has a logic one value, then the value of N is aligned to the third particular bit location and added to the third summed value. On the other hand, the value of N is not added to the third summed value when the third particular bit location of the third summed value has a logic zero. In this example, the third bit location from the right of the third summed value (10_1_00) has a logic one value and the value of N is aligned to the third bit position from the right and added to the third summed value.

| (11) |   | 010100  | <== | third summed value |
| (12) | + | 1101    | <== | the value of N properly aligned |
| (13) |   | 1001000 | <== | result of third bit reduction |

The generation of the fourth bit multiply involves the multiplication of (1) by the logic value of the bit that is located in the fourth bit location (_0_111) from the right for the value (B*R mod N).

| (1)  |   | 0001 | <== | initial value |
| (14) | × | 000_0_ | <== | fourth bit location on the right of (B*R mod N) |
| (15) |   | 0000 | <== | product of the fourth bit multiply |

Following the fourth bit multiply, the product of the fourth bit multiply (15) is added to the previous result (13) to provide the fourth summed value (16).

| (15) |   | 0000    | <== | product of the fourth bit multiply |
| (13) |   | 1001000 | <== | previous result |
| (16) |   | 1001000 | <== | fourth summed value |

The fourth particular bit location of the fourth summed value (16) is checked for a logic one or a logic zero value. For this example, the fourth particular bit location of the fourth summed value (16) is the fourth bit location from the right (100_1_000). In this example the fourth bit location from the right (100_1_000) has a logic one value and accordingly, the value of N is aligned to the fourth bit location from the right and added to the fourth summed value.

| (16) |   | 01001000 | <== | fourth summed value |
| (17) | + | 1101     | <== | the value of N properly aligned |
| (18) |   | 10110000 | <== | result of fourth bit reduction |

The product of (A*R mod N) and (B*R mod N), i.e., (0001) and (0111), has a value (A*B*R mod N) or (10110000). Dividing (A*B*R mod N) by R results in (A*B*R mod N) or (1011). It should be noted that the value for R is selected as an integer multiple of base two. Put another way, R can only have values such as $2^1, 2^2, 2^3, \ldots, 2^I$, where I is an integer. For this example R is selected to have a value of $2^4$. Typically, R is selected to have the value $2^S$, where S is the number of bits of the modulus N. Thus, the operation of dividing by R is achieved by the simple operation of shifting the product to the right by the number of times I. It should be further noted that after division by R the value (A*B*R mod N) is in Montgomery form, i.e., a form that is (value*R) mod N. The value (A*B*R mod N) in Montgomery form allows multiple passes through co-processor 44. The pipelining technique used by co-processor 44 is an efficient method of multiplying (A*R mod N) and (B*R mod N) when the values of A, B, R, and N are large.

In contrast with the Montgomery Reduction Algorithm, the value of $\mu$ in the Foster-Montgomery Reduction Algorithm is not computed prior to the multiplication of the two operands but, as noted in the previous example, the reduction occurs after each bit multiply is summed with a previous result. It should be noted that the value for N is odd, i.e., the value of N has a logic one value in the position for the least significant bit. By adding N to the summed value when the logic value of the particular bit location has a logic one value, the value (A*B*R mod N) is generated having a number of zeros in the lower bit locations. Put another way, the Foster-Montgomery Reduction Algorithm causes at least the number I of the least significant bit locations to have logic zero values.

Following computations through co-processor 44 where the data is in the form (A*B*R mod N), the desired final form for the data is (A*B mod N). The value of (A*B*R mod N) in the example is (1011). The value (A*B*R mod N) is reduced in preparation for dividing by R. The reduction of (A*B*R mod N) involves aligning the least significant bit location of N with the right most bit location having a logic one in the value of (A*B*R mod N). By way of example, the value (A*B*R mod N) has a logic one value in the right most bit location (101_1_). After properly aligning the value of N and summing with (A*B*R mod N), the summed value after the first bit reduction has a value of 11000.

| | | | |
|---|---|---|---|
| (19) | | 1011 <== | value of (A*B*R mod N) |
| (20) | + | 1101 <== | value of N |
| (21) | | 11000 <== | new summed value after the first bit reduction |

The reduction of the new summed value involves aligning the least significant bit location of N with the right most bit location of the new summed value having a logic one value (11000). A value after the second bit reduction is (10000000).

| | | | |
|---|---|---|---|
| (21) | | 11000 <== | value after the first bit reduction |
| (22) | + | 1101 <== | value of N |
| (23) | | 10000000 <== | value after the second bit reduction |

When a number of bits I in the least significant bit locations have logic zero values, the value of (A*B*R mod N) is reduced and ready for dividing by R. In other words, the operation of dividing by R is changed to an operation of shifting the reduced summed value to the right by the number of times I, where I equals 4 in this example.

(23) 10000000<==value after the second bit reduction

(24) Divide by R or shift right I times.

Thus, after division by R the encrypted data has a value of (1000) and the Foster-Montgomery Reduction Algorithm has been used in the multiplication of (A*R mod N) by (B*R mod N). The steps 19–24 of the example provide the division by R that reduces the value (A*B*R mod N) to (A*B mod N). In practice this final division by R is achieved by multiplying (A*B*R mod N) by 1 and then reducing.

In operation, A/B RAM 72 is loaded through host I/F block 40 with operand A having sixty-four values, i.e., $A_0$, $A_1$, ..., $A_{63}$, and operand B having sixty-four values, i.e., $B_0$, $B_1$, ..., $B_{63}$. The 1024 bit operand A includes sixty-four digits $A_{63}$–$A_0$ where each digit has sixteen bits of data. Likewise, the 1024 bit operand B includes sixty-four digits $B_{63}$–$B_0$ where each digit has sixteen bits of data. Thus, the A section of A/B RAM 72 has 64 rows that allow an entire 1024 bit operand A to be stored and the B section of A/B RAM 72 has 64 rows that allow an entire 1024 bit operand B to be stored. In addition, N RAM 70 is loaded through host I/F block 40 and has 1024 bits that are segmented into sixty-four digits of $N_{63}$–$N_0$.

Multiplier 56 works on data one digit at a time. Therefore, a multiplication of operands A and B for encryption or decryption starts by transferring the lower digits of values A, B, and N to co-processor 44. Terminal 48 of co-processor 44 receives the digit $A_0$, terminal 46 of co-processor 44 receives the digit $B_0$, and terminal 52 of co-processor 44 receives the digit $N_0$. The product of the values $A_0$ and $B_0$ is computed by multiplier 56 and the sixteen least significant data bits are inputs of adder 58. The most significant sixteen data bits are temporarily stored in the multiplier 56 carry chains.

Adder 58 adds the sixteen data bits received from multiplier 56 with the sixteen data bits stored in product RAM 64 (initially zero) and generates a summed value. Modulo reducer 60 receives the sixteen bit summed value from adder 58 and the digit $N_0$ from N RAM 70. In the Foster-Montgomery Reduction Algorithm the logic values of particular bit locations of the summed value determine whether the summed value should be reduced. Modulo reducer 60 initially begins with the particular bit location as the least significant bit location and with each subsequent bit multiply the particular bit location is moved one bit location to the left. In other words, the particular bit location starts at the least signification bit location and is indexed toward the most signification bit location following each bit multiply. By properly aligning the value of $N_0$ at the particular bit location and adding $N_0$ to the summed value, the first partial product resulting from multiplying the values $A_0$ and $B_0$ is reduced and has a value of zero. The partial products generated by modulo reducer 60 are stored in product RAM 64. In addition, a sixteen bit value of $\mu$ is determined in accordance with the logic values found in the particular bit locations and stored within modulo reducer 60.

To generate the second partial product a new binary data value $B_1$ is transferred from A/B RAM 72 to co-processor 44 for multiplication with the value $A_0$. Multiplier 56 computes the product of the values $A_0$ and $B_1$ and the sixteen least significant data bits are inputs of adder 58. Adder 58 adds the sixteen data bits received from multiplier 56 with the sixteen data bits stored in product RAM 64 (initially zero) and generates a summed value. Modulo reducer 60 receives the sixteen bit summed value from adder 58 and the digit $N_1$ from N RAM 70. Modulo reducer 60 uses the previously derived value of $\mu$, determined from the generation of the first partial product, and the value of $N_1$ to reduce the summed value from adder 58 and generate the second partial product. The second partial product is stored in product RAM 64.

To complete the generation of the partial products in the first group, the values $B_2$–$B_{63}$ from A/B RAM 72 are sequentially transferred to co-processor 44 for multiplication with the value $A_0$. Using the same value of $\mu$, modulo reducer 60 generates the remaining partial products using corresponding values of $N_2$–$N_{63}$ from N RAM 70. The partial products are stored in product RAM 64.

After completing the sixty-four partial products resulting from the multiplication of $A_0$ by the digits $B_0$–$B_{63}$, the second group of sixty-four partial products resulting from the multiplication of Al by the digits $B_0$–$B_{63}$ are generated. It should be noted that in generating the partial product for $A_1$ and $B_0$ that a value of $\mu$ is determined which is used in generating the remaining partial products that involve $A_1$. Further, the remaining groups of partial products are generated by multiplying $A_2$ by the digits $B_0$–$B_{63}$, $A_3$ by the digits $B_0$–$B_{63}$, ..., $A_{63}$ by the digits $B_0$–$B_{63}$. The value for $\mu$ is determined and set for each group when the partial product involving $B_0$ is generated. It should be noted that the value for $\mu$ is determined and set when digit $B_0$ is the value at terminal 46 of co-processor 44 and that the partial product generated at output 54 is reduced to have a value of zero. Each group also uses corresponding values of $N_0$–$N_{63}$.

Figure 4:
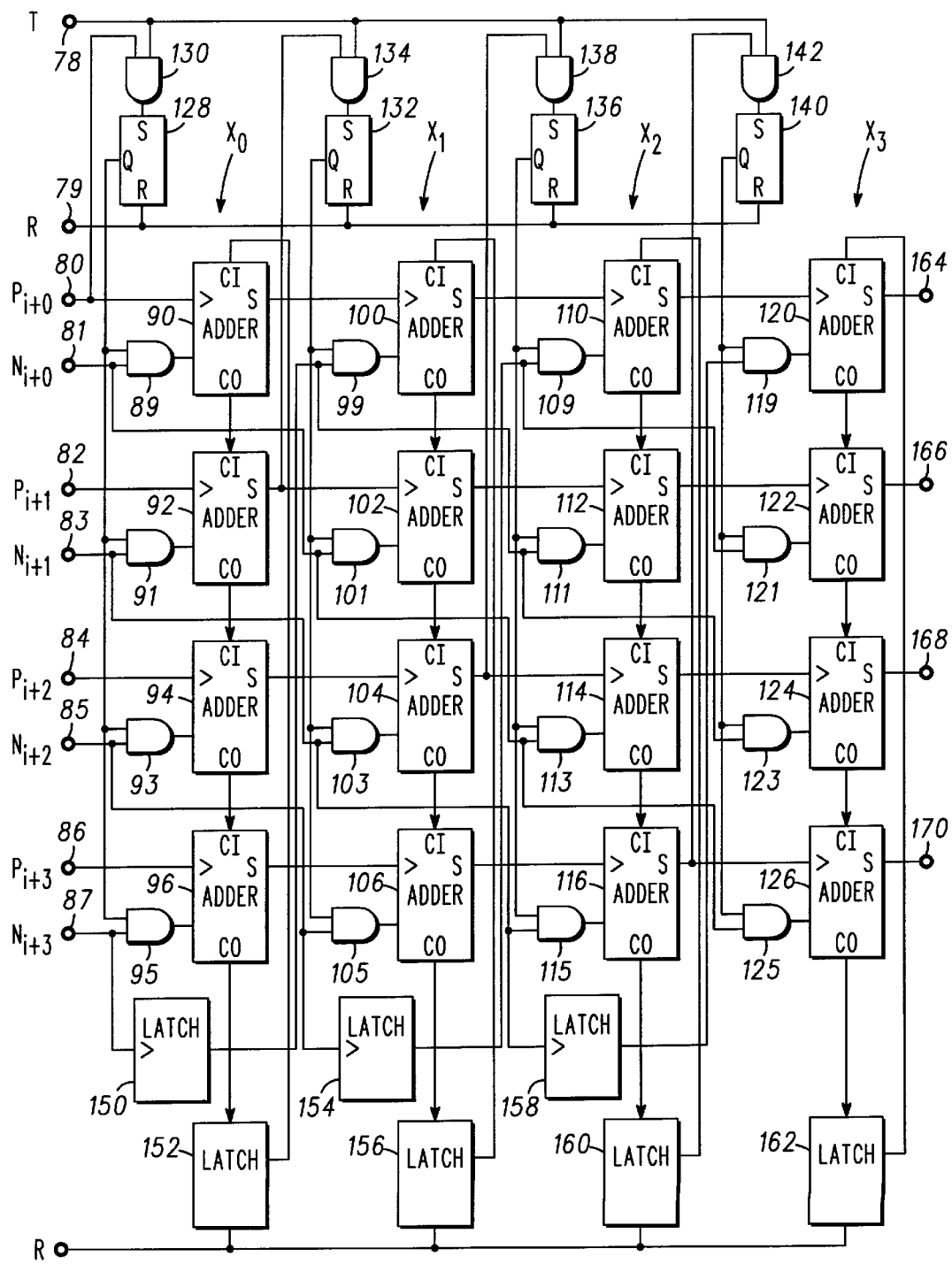
FIG. 4 is a block diagram of a portion of a modulo reducer.

FIG. 4 is a block diagram of a portion of modulo reducer 60. Modulo reducer 60 is described in simplified form for simplicity and illustrative purposes as being a four by four array of adders. In the preferred embodiment modulo reducer 60 includes an adder array having sixteen rows and sixteen columns. It should be noted that it is not a limitation of the present invention that the number of rows in the adder array match the number of columns. Co-processor 44 can operate with adder arrays in modulo reducer 60 that are not square.

The adder array of modulo reducer 60 has X columns and Y rows, where X and Y are integer numbers. Column $X_0$ is the first column and includes adders 90, 92, 94, and 96. Column $X_1$ is the second column and includes adders 100, 102, 104, and 106. Column $X_2$ is the third column and includes adders 110, 112, 114, and 116. Column $X_3$ is the fourth column and includes adders 120, 122, 124, and 126. Each of the adders 90–96, 100–106, 110–116, and 120–126 have first and second data inputs, a carry input (CI), a carry output (CO), and a sum output (S).

The first inputs of adders 90, 92, 94, and 96 in column $X_0$ are connected to terminals 80, 82, 84, and 86, respectively. Two input AND gates 89, 91, 93, and 95 have a first input connected to each other and to a Q output of latch 128. The outputs of AND gates 89, 91, 93, and 95 are connected to the second inputs of adders 90, 92, 94, and 96, respectively. In addition, a carry output (CO) of adder 90 is connected to a carry input (CI) of adder 92, a carry output of adder 92 is connected to a carry input of adder 94, and a carry output of adder 94 is connected to a carry input of adder 96. The carry output of adder 96 is connected to a data input of a latch 152. The output of latch 152 is connected to the carry input of adder 90.

The first inputs of adders 100, 102, 104, and 106 in column $X_1$ are connected to the respective outputs of adders 90, 92, 94, and 96 in column $X_0$. Two input AND gates 99, 101, 103, and 105 have a first input commonly connected to each other and to a Q output of a latch 132. The outputs of AND gates 99, 101, 103, and 105 are connected to the second inputs of adders 100, 102, 104, and 106, respectively. In addition, a carry output of adder 100 is connected to a carry input of adder 102, a carry output of adder 102 is connected to a carry input of adder 104, and a carry output of adder 104 is connected to a carry input of adder 106. The carry output of adder 106 is connected to a data input of a latch 156. The output of latch 156 is connected to the carry input of adder 100.

The first inputs of adders 110, 112, 114, and 116 in column $X_2$ are connected to the respective outputs of adders 100, 102, 104, and 106 in column $X_1$. Two input AND gates 109, 111, 113, and 115 have a first input commonly connected to each other and to a Q output of a latch 136. The outputs of AND gates 109, 111, 113, and 115 are connected to the second inputs of adders 110, 112, 114, and 116, respectively. In addition, a carry output of adder 110 is connected to a carry input of adder 112, a carry output of adder 112 is connected to a carry input of adder 114, and a carry output of adder 114 is connected to a carry input of adder 116. The carry output of adder 116 is connected to a data input of a latch 160. The output of latch 160 is connected to the carry input of adder 110.

The first inputs of adders 120, 122, 124, and 126 in column $X_3$ are connected to the respective outputs of adders 110, 112, 114, and 116 in column $X_2$. Two input AND gates 119, 121, 123, and 125 have a first input commonly connected to each other and to a Q output of a latch 140. The outputs of AND gates 119, 121, 123, and 125 are connected to the second inputs of adders 120, 122, 124, and 126, respectively. In addition, a carry output of adder 120 is connected to a carry input of adder 122, a carry output of adder 122 is connected to a carry input of adder 124, and a carry output of adder 124 is connected to a carry input of adder 126. The carry output of adder 126 is connected to a data input of a latch 162. The output of latch 162 is connected to the carry input of adder 120. The output S of adders 120, 122, 124, and 126 are connected to respective output terminals 164, 166, 168, and 170.

Further, the second inputs of AND gates 89, 101, 113, and 125 are commonly connected to each other and to input terminal 81. The second inputs of AND gates 91, 103, and 115 are commonly connected to each other, to an input of a latch 158, and to input terminal 83. The second inputs of AND gates 93 and 105 are commonly connected to each other, to an input of a latch 154, and to input terminal 85. The second input of AND gate 95 is commonly connected to an input of a latch 150, and to input terminal 87. The second inputs of AND gates 99, 111, and 123 are commonly connected to each other and to an output of latch 150. The second inputs of AND gates 109 and 121 are commonly connected to each other and to an output of latch 154. The second input of AND gate 119 is connected to an output of latch 158.

Latches 128, 132, 136, and 140 each have a set input (S), a reset input (R), and an output (Q). Latches 128, 132, 136, and 140 are enabled when signal T is high and the signal at output Q has the same value as the signal at input S. The signal at output Q is latched when the signal T transitions from a high to a low logic value. The signal at input R resets the signal at output Q. The reset inputs R of latches 128, 132, 136, and 140 are commonly connected to each other and to terminal 79. Terminal 79 is coupled for receiving a reset signal R. A two input AND gate 130 has an output connected to the set input of latch 128. The first input of AND gate 130 is connected to the first input of adder 90. A two input AND gate 134 has an output connected to the set input of latch 132. The first input of AND gate 134 is connected to the first input of adder 102. A two input AND gate 138 has an output connected to the set input of latch 136. The first input of AND gate 138 is connected to the first input of adder 114. A two input AND gate 142 has an output connected to the set input of latch 140. The first input of AND gate 142 is connected to the first input of adder 126. The second inputs of AND gates 130, 134, 138, and 142 are commonly connected to each other and to terminal 78. Terminal 78 is coupled for receiving a signal T.

In operation, modulo reducer 60 receives inputs from multiplier 56 via adder 58 (FIG. 3) and generates partial products that have been reduced. In the previous example the numbers 0001 and 0111 were multiplied using the Foster-Montgomery Reduction Algorithm. As previously mentioned, the logic values at a particular bit location determine whether the value of N is aligned and added to the summed value. The architecture of modulo reducer 60 shifts the value of N to both be aligned and added to the summed value when the logic value at a particular bit location has a logic one value. Thus, the architecture of modulo reducer 60 allows the value of $\mu$ to be determined and stored in latches 128, 132, 136, and 140. In other words, the value of $\mu$ is not determined prior to the multiplication of digits A and B, but rather during the multiplication of particular digits of A and B.

Latches 128, 132, 136, and 140 are reset by the signal R and have logic zero values at the Q outputs. The value 0111 is generated by multiplier 56 and transferred via adder 58 to terminals 80, 82, 84, and 86. AND gate 130 receives the least significant data bit of the summed value from terminal 80 and together with the signal T at a logic one value causes latch 128 to set, i.e., the signal at the Q output has a logic one value. It should be noted that the signal T has a logic one value during the time that $B_0$ is supplied to multiplier 56 and the value of $N_0$ is supplied to modulo reducer 60. When the signal T transitions from a logic one value to a logic zero value the logic value of the data in latches 128, 132, 136, and 140 is latched. The value of $N_0$ is supplied at terminals 81, 83, 85, and 87 and in keeping with the previous example, $N_0$ has a value of 1101. The least significant data bit of $N_0$ is supplied at terminal 81.

AND gates 89, 91, 93, and 95 are enabled by the signal at the Q output of latch 128 having a logic one value. Thus, the value of $N_0$ received at terminals 81, 83, 85, and 87 is transferred to the second inputs of adders 90, 92, 94, and 96, respectively. Adder 90 having a logic one at the first and second inputs provides a summed output signal at output S having a logic zero value. Further, adder 90 generates a carry signal at output CO. Adder 92 receives a logic zero value at the first input in response to the logic zero value at terminal 83. With a logic one value received at the second input of adder 92 and a logic one value received for the carry signal at input CI, the summed signal at output S has a logic zero value and the carry signal at output CO has a logic one value.

Adder 94 receives a logic one at the first input from AND gate 93 and a logic one at the second input from terminal 84. The summed output S of adder 94 has a logic one value and the carryout signal has a logic one value at the carry output CO. Likewise, adder 96 receives a logic one at the first input from AND gate 95 and a logic one at the second input from terminal 86. The summed output signal at output S of adder 96 has a logic zero value and the carry signal at the carry output CO has a logic one value. Thus, adders 90–96 have generated the value of 0100 in response to receiving the summed value of multiplier 56 through adder 58. In addition, the particular bit location, i.e., the least significant bit location, has a logic one value and the value N was aligned and added to the summed value in accordance with the Foster-Montgomery Reduction Algorithm.

The data generated by the adders in column $X_1$ have values that depend on the data at a particular data bit location. The particular data bit location in this instance corresponds with the output S of adder 92. It should be noted that AND gate 134 receives a logic zero value from the summed signal at output S of adder 92. Latch 132 is not set and the Q output of latch 132 remains a logic zero value. AND gates 99, 101, 103, and 105 generate a logic zero value at the second inputs of adders 100, 102, 104, and 106, respectively. Adder 100 has logic zero values at both the first and second inputs and generates a logic zero value at output S. Likewise, adder 102 has logic zero values at both the first and second inputs and generates a logic zero value at output S. Adder 104 has a logic zero value at the first input and a logic one value at the second input and generates a logic one value at output S. Adder 106 has logic zero values at both the first and second inputs and generates a logic zero value at output S. Thus, the adders in column $X_1$ generate a value 0100.

The data generated by the adders in column $X_2$ have values that also depend on the data at a particular data bit location. It should be noted that AND gate 138 receives a logic one value from the summed signal at output S of adder 104. Latch 136 is set and the Q output of latch 136 has a logic one value. AND gates 109, 111, 113, and 115 are enabled by the logic one value generated by latch 136, i.e., the data at the outputs of adders 100, 102, 104, and 106 is transferred to the first inputs of adders 110, 112, 114, and 116, respectively. Adder 110 has logic zero values at both the first and second inputs and generates a logic zero value at output S. Likewise, adder 112 has logic zero values at both the first and second inputs and generates a logic zero value at output S. Adder 114 has logic one values at both the first and second inputs and generates a logic zero value at output S and a logic one value for the carryout signal at output CO. Adder 116 has logic zero values at both the first and second inputs, a logic one at the carry input and generates a logic one value at output S. Thus, the adders in column $X_2$ generate a value 1000.

The data generated by the adders in column $X_3$ have values that also depend on the data at a particular data bit location. It should be noted that the particular data bit in this instance is the logic value at the output of adder 116. AND gate 142 receives a logic one value from the summed signal at output S of adder 116. Latch 140 is set and the Q output of latch 140 has a logic one value. AND gates 109, 111, 113, and 115 are enabled by the logic one value generated by latch 140, i.e., the data at the outputs of adders 110, 112, 114, and 116 is transferred to the first inputs of adders 120, 122, 124, and 126, respectively. Adder 120 has logic zero values at both the first and second inputs and generates a logic zero value at output S. Likewise, adder 122 has logic zero values at both the first and second inputs and generates a logic zero value at output S. Adder 124 also has logic zero values at both the first and second inputs and generates a logic zero value at output S. Adder 126 has logic one values at both the first and second inputs and generates a logic zero value at output S and a logic one value as the carryout signal at the carry output. Thus, the adders in column $X_3$ generate a value 0000.

After the adders in columns $X_0$, $X_1$, $X_2$, and $X_3$ have reduced the partial product value that results for a digit of A, the digit $B_0$, and the value of $N_0$, it should be noted that a value for $\mu$ has been determined for use in subsequent multiplications. In particular, during the reduction process that causes the first partial product of each group to have a value of zero, the appropriate latches 128, 132, 136, and 140 have been set and contain the value for $\mu$. Following the reduction of the first partial product to zero, the signal T transitions from a logic one to a logic zero value and stores the value of $\mu$ in latches 128, 132, 136, and 140. The stored value of $\mu$ and corresponding values of $N_1-N_{63}$ are used by modulo reducer 60 when the digit of A is multiplied by the digits $B_1-B_{63}$ in multiplier 56.

By way of example, the sixteen least significant data bits for the product of the digits $A_0$ and $B_0$ are reduced to sixteen bits of logic zero by modulo reducer 60 using the value No. Modulo reducer 60 determines and stores the value of $\mu$ that causes the first partial product to be reduced to a zero value. Multiplier 56 stores the most significant data bits for use in generating the next partial product that involves the values $A_0$ and $B_1$. Modulo reducer 60 uses the stored value of $\mu$ and the value of $N_1$ to generate the second partial product. The other products involving $A_0$ with $B_2-B_{63}$ are generated by multiplier 56 and reduced in modulo reducer 60 using the stored value of $\mu$ and the values of $N_2-N_{63}$.

Modulo reducer 60 determines and stores a new value of $\mu$ that causes the first partial product of the second group, i.e., the product of $A_1$ and $B_0$ to be reduced to a zero value. The new value of $\mu$ is used in generating the group of partial products involving $A_1$ multiplied with $B_0-B_{63}$. Thus, following the generation of all the partial products in a group, a new value of $\mu$ is determined by modulo reducer 60 for the next group. It should be noted that the first partial product generated for each group is reduced by the new value of $\mu$ to have a zero value.

Figure 5:
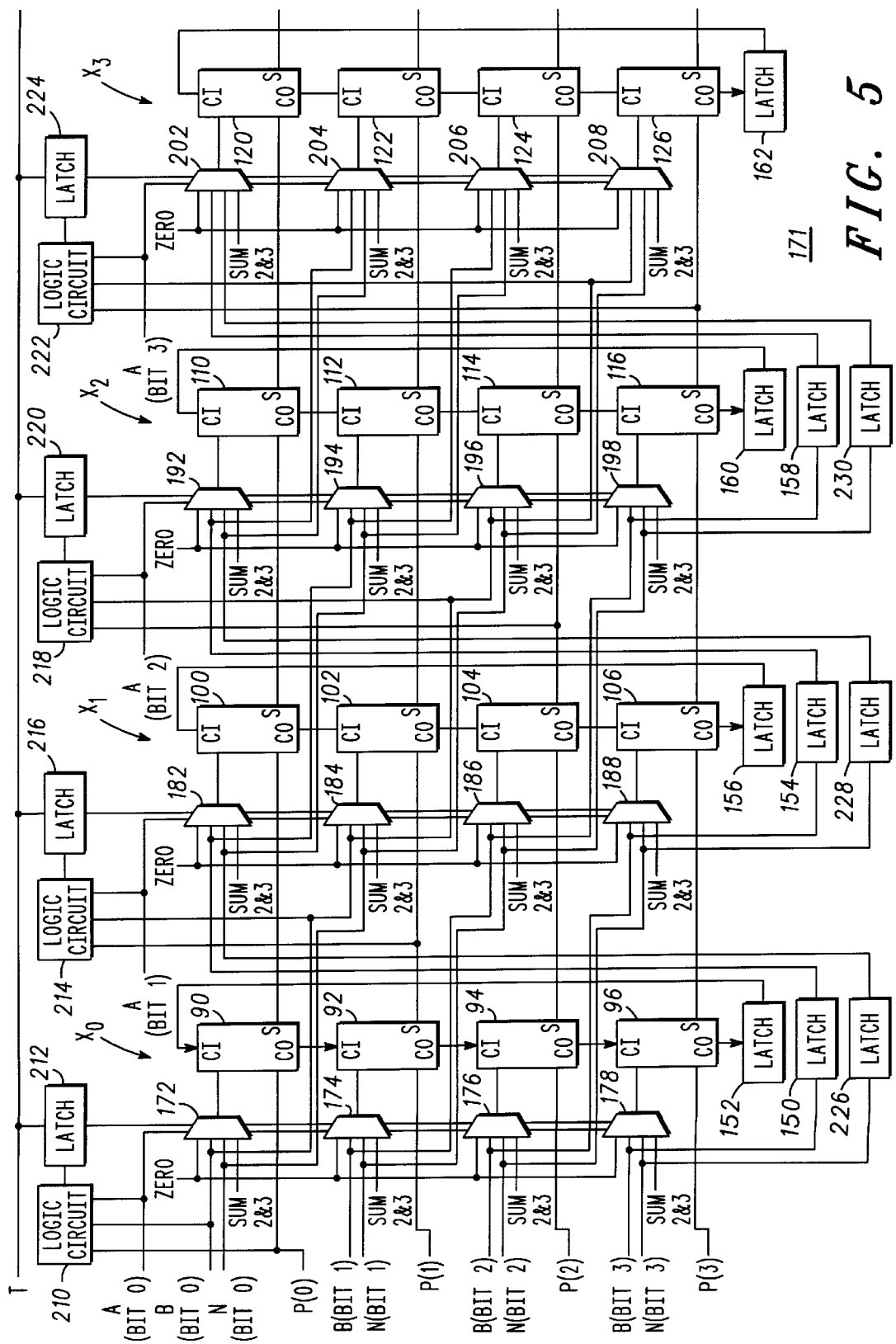
FIG. 5 is a block diagram of a portion of the modulo reducer combined with a multiplier for use in the FMHA block of FIG. 1.

FIG. 5 is a block diagram of a portion of modulo reducer 60 combined with multiplier 56 for use in co-processor 44 of FIG. 3. The multiplier structure or merged Foster-Montgomery (F-M) multiplier 171 is described in simplified form for simplicity and illustrative purposes as being a four by four array of adders. Although merged F-M multiplier 171 is described as an array of adders having the same number of rows and columns, this is not a limitation of the present invention. It should be noted that the main functionality of multiplier 56, adder 58, and modulo reducer 60 of FIG. 3 is combined and performed by merged F-M multiplier 171.

The form of merged F-M multiplier 171 that is illustrated in FIG. 5 is similar to the form of the modulo reducer 60 that is illustrated in FIG. 4. Both merged F-M multiplier 171 and modulo reducer 60 have adders 90, 92, 94, and 96 in column $X_0$, adders 100, 102, 104, and 106 in column $X_1$, adders 110, 112, 114, and 116 in column $X_2$, and adders 120, 122, 124, and 126 in column $X_3$. In addition, latches 152, 156, 160, and 162 store carryout signals that are used in generating the next partial product. The AND gates of modulo reducer 60 having outputs that are connected to the input of each adder in columns $X_0$–$X_3$ have been replaced in merged F-M multiplier 171 by multiplexers. Although the multiplexers are illustrated as having outputs connected to the first input of the adders, alternatively, the outputs of the multiplexers could be connected to the second inputs of the adders.

The multiplexers (muxes) in merged F-M multiplier 171 each have four inputs, an output, and two selector inputs. In particular, muxes 172, 174, 176, and 178 have outputs connected to adders 90–96, respectively. Muxes 182, 184, 186, and 188 have outputs connected to adders 100–106, respectively. Muxes 192, 194, 196, and 198 have outputs connected to adders 110–116, respectively. Muxes 202, 204, 206, and 208 have outputs connected to adders 120–126, respectively. Further, the first selector inputs of muxes 172–178 are commonly connected and the second selector inputs of muxes 172–178 are commonly connected and cause one of the four signals present at the four inputs of each mux to transfer to the corresponding first inputs of adders 90–96. Likewise, the first selector inputs of muxes 182–188 are commonly connected and the second selector inputs of muxes 182–188 are commonly connected and cause one of the four signals present at the four inputs of each mux to transfer to the corresponding first inputs of adders 100–106. The first selector inputs of muxes 192–198 are commonly connected and the second selector inputs of muxes 192–198 are commonly connected and cause one of the four signals present at the four inputs of each mux to transfer to the corresponding first inputs of adders 110–116. The first selector inputs of muxes 202–208 are commonly connected and the second selector inputs of muxes 202–208 are commonly connected and cause one of the four signals present at the four inputs of each mux to transfer to the corresponding first inputs of adders 120–126.

The first of the four inputs of muxes 172–178, 182–188, 192–198, and 202–208 is coupled for receiving a logic zero value. The second inputs of muxes 172–178 receive the value of digit B and the third inputs of muxes 172–178 receive the value of N. The fourth inputs of muxes 172–178 receive the summed value of the respective values for N and B. By way of example, the digits $A_0$, $B_0$, and $N_0$ are supplied to merged F-M multiplier 171. The least significant data bit of the digit $B_0$, i.e., signal B(BIT 0), is supplied to the second input of mux 172. Likewise, the least significant data bit of the digit $N_0$, i.e., signal N(BIT 0), is supplied to the third input of mux 172. The fourth input of mux 172 receives the logical summed value of the least significant data bits of $N_0$ and $B_0$, i.e., signal N+B(BITS 0).

The next least significant data bit of the digit $B_0$, i.e., signal B(BIT 1), is supplied to the second input of mux 174. Likewise, the next least significant data bit of the digit No, i.e., signal N(BIT 1), is supplied to the third input of mux 174. The fourth input of mux 174 receives the logical summed value of the next least significant data bits of $N_0$ and $B_0$, i.e., signal N+B(BITS 1). The next data bit of the digit $B_0$, i.e., signal B(BIT 2), is supplied to the second input of mux 176. Likewise, the next data bit of the digit $N_0$, i.e., signal N(BIT 2), is supplied to the third input of mux 176. The fourth input of mux 176 receives the logical summed value of the next data bits of $N_0$ and $B_0$, i.e., signal N+B(BITS 2). Likewise, in this example where merged F-M multiplier 171 provides a four bit by four bit multiplication, the most significant data bit of the digit $B_0$, i.e., signal B(BIT 3), is supplied to the second input of mux 178. Likewise, the most significant data bit of the digit $N_0$, i.e., signal N(BIT 3), is supplied to the third input of mux 178. The fourth input of mux 178 receives the logical summed value of the values supplied at the second and third inputs of the mux, i.e., the sum of the most significant data bits of digits $N_0$ and $B_0$. It should be noted that the fourth input of each mux receives the logical summed value of the values supplied at the second and third inputs of that mux.

The first selector input signal of muxes 172–178 is received from a latch 212. Latch 212 latches a data signal from logic circuit 210 when the signal T transitions from a logic one to a logic zero value. The data signal generated by logic circuit 210 is the product of the signals A(BIT 0) and B(BIT 0) exclusive or'ed with P(0), where P(0) is the least significant bit of the previous partial product value. Muxes 172–178 receive the signal A(BIT 0) at the second selector input.

The first selector input signal of muxes 182–188 is received from a latch 216. Latch 216 latches a data signal from logic circuit 214 when the signal T transitions from a logic one to a logic zero value. The data signal generated by logic circuit 214 is the product of the signals A(BIT 1) and B(BIT 0) exclusive or'ed with the summed output signal from adder 92. Muxes 182–188 receive the signal A(BIT 1) at the second selector input.

The first selector input signal of muxes 192–198 is received from a latch 220. Latch 220 latches a data signal from logic circuit 218 when the signal T transitions from a logic one to a logic zero value. The data signal generated by logic circuit 218 is the product of the signals A(BIT 2) and B(BIT 0) exclusive or'ed with the summed output signal from adder 104. Muxes 192–198 receive the signal A(BIT 2) at the second selector input.

The first selector input signal of muxes 202–208 is received from a latch 224. Latch 224 latches a data signal from logic circuit 222 when the signal T transitions from a logic one to a logic zero value. The data signal generated by logic circuit 222 is the product of the signals A(BIT 3) and B(BIT 0) exclusive or'ed with the summed output signal from adder 116. Muxes 202–208 receive the signal A(BIT 3) at the second selector input.

When the first and second selector inputs receive respective logic values of 00, the signals at the first inputs of muxes 172–178 are transferred to the outputs of the corresponding muxes. When the first and second selector inputs receive respective logic values of 01, the signals at the second inputs of muxes 172–178 are transferred to the outputs of the corresponding muxes. When the first and second selector inputs receive respective logic values of 10, the signals at the third inputs of muxes 172–178 are transferred to the outputs of the corresponding muxes. When the first and second selector inputs receive respective logic values of 11, the signals at the fourth inputs of muxes 172–178 are transferred to the outputs of the corresponding muxes.

It should be noted that the architecture of merged F-M multiplier 171 allows the value of $\mu$ to be determined and stored in latches 212, 216, 220, and 224. In other words, the value of $\mu$ is not calculated prior to the multiplication of A and B, but rather the architecture of merged F-M multiplier 171 allows the first value of $\mu$ to be determined and latched in latches 212, 216, 220, and 224 during the multiplication of the digits $A_0$ and $B_0$. Thus, during the same multiplication cycle that is used to calculate the product of $A_0$ and $B_0$ is used to determine the value of $\mu$. That first value of $\mu$ is used during the multiplication of the other digits $B_{1-B63\ and\ A0}$. A second value of $\mu$ is determined during the multiplication of the digits $A_1$ and $B_o$. That second value of $\mu$ is latched in latches 212, 216, 220, and 224 and used during the multiplication of the digits $B_1$–$B_{63}$ and $A_1$. Thus, a new value of $\mu$ is determined during the multiplication of each digit of A and $B_0$.

Figure 6:
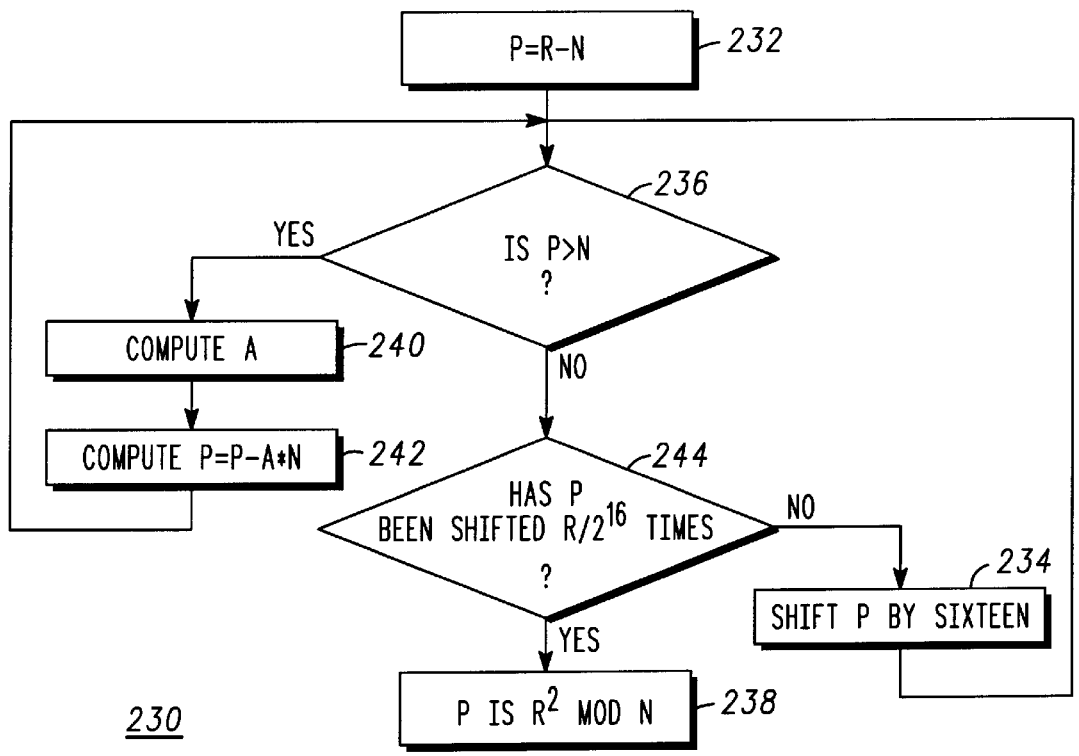
FIG. 6 is a flow diagram 230 that illustrates a method for generating the value ($R^2$ mod N) that is used in the Foster-Montgomery Reduction Algorithm.

FIG. 6 is a flow diagram of a method for determining the value of ($R^2$ mod N) that is used in the Foster-Montgomery Reduction Algorithm. The operands A and B in the Foster-Montgomery Reduction Algorithm have the form of (A*R mod N) and (B*R mod N) and are multiplied to generate the product (A*B*$R^2$ mod N). The product (A*B*$R^2$ mod N) is reduced within merged F-M multiplier 171 (FIG. 5) by the value R in order that the output generated by merged F-M multiplier 171 have the value (A*B*R mod N). The generation of the value ($R^2$ mod N) is needed as an input value of merged F-M multiplier 171 for converting the initial values of operand A received via the DATA HOST BUS (FIG. 3) to a proper form of (A*R mod N) and the initial values for operand B to a proper form of (B*R mod N). Thus, the initial values of operands A and B are converted into Montgomery format. For instance, the operand A multiplied by the value ($R^2$ mod N) in merged F-M multiplier 171 has an output value that has been reduced and is (A*R mod N). Likewise, the multiplication of the operand B by the value $R^2$ mod N in merged F-M multiplier 171 generates an output value that is also reduced and has the value (B*R mod N).

FIG. 6 is a flow diagram 230 that illustrates a method for generating the value ($R^2$ mod N). The value ($R^2$ mod N) has components of (R mod N) and R, where R is $2^{16}$* I or 2 raised to an integer number. R is selected as having a size that is one more digit than the number of digits that represent N. Block 232 illustrates the generation of a variable having an initial value P for the value (R mod N). The value of P is computed by subtracting the value of R from the value of N. Following generation of an initial value of P, block 236 shows the value of P is compared to the value of N. If the value of P is greater than the value of N, then block 240 shows that a multiplier A value is computed, where the multiplier A value is the largest power of two that the value of N can be multiplied by and still have a value that is less than the value of P. Block 242 shows that the value of multiplier A is multiplied by the value of N and the product (A*N) is subtracted from the value of P to generate a new value of P. If, in block 236, the value of N is greater than the value of P, then the number of times that the value of P has been shifted is represented in block 244. If the value of P has been shifted by the number of zero's in the least significant bits of R, then the computation is complete and the value of P in block 238 is the desired value ($R^2$ mod N). Alternatively, if additional shifting is required for the value of P as indicated in block 244, then P is shifted as indicated in block 234 by an integer value. The integer value is selected as the digit size of the system and an appropriate number of shifts to the left of a most significant data bit of P having a value of "1" results in the value R.

The computation of A represented by block 240 can be accomplished by two different methods. The first method generates A such that the value of A is the largest power of two that the value of N can be multiplied by and still have a value that is less than the value of P. The second method computes A to be one less than the integer result of dividing the most significant digit of P by the most significant digit of N. In flow diagram 230, the first method of computing a value of A will result in performing a loop through blocks 236, 240 and 242 several more times than will the second method of computing a value of A. However, the circuitry required for the second method is more complicated than the circuitry for the first method.

Figure 7:
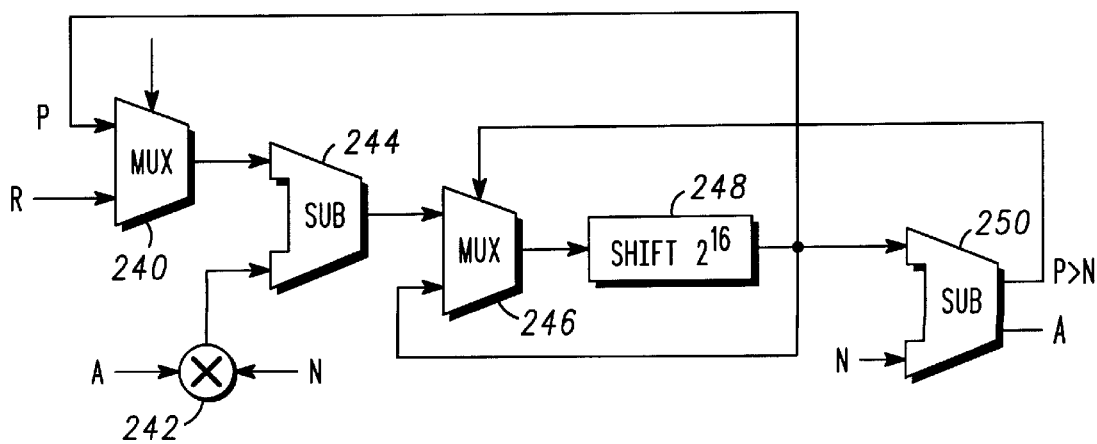
FIG. 7 is a block diagram that illustrates the generation of the value ($R^2$ mod N) as described in FIG. 6.

FIG. 7 is a block diagram that illustrates the generation of the value (R mod N) as described in FIG. 6. Initially, a mux 240 transfers the value of R from a first input of mux 240 to an input of subtractor 244. Also, the value of A is initially zero so that a multiplier 242 generates the value of A at the other input of subtractor 244. Subtractor 244 provides the value (R–N) or P at the first input of a mux 246 (see block 232 in FIG. 6). Mux 246 transfers the value of P to a shift circuit 248 that shifts the data sixteen places, i.e., the data is multiplied by $2^{16}$ (see block 234 in FIG. 6). A comparator 250 verifies whether the shifted data has a value that is greater than the value of N (see block 236 in FIG. 6). By way of example, comparator 250 is a subtractor that provides a difference between the values of $P_{SHIFTED}$ and N. Comparator 250 could also include exclusive-OR gates that provide a bit-wide comparison for the values of $P_{SHIFTED}$ and N.

When the shifted value of P, i.e., $P_{SHIFTED}$, has a value that is not greater than the value of N, then the value of $P_{SHIFTED}$ is transferred to the second input of mux 246 and a new value of $P_{SHIFTED}$ is generated. The new value of $P_{SHIFTED}$ has data that is shifted another sixteen places by shift circuit 248. Following each shifting of data within shift circuit 248, the new shifted value is compared to the value of N in comparator 250. When the new value of $P_{SHIFTED}$ has a value that is greater than the value of N, then the value ($R^2$ mod N) is generated. Mux 240 transferring the new value of $P_{SHIFTED}$ to a first input of subtractor 244. The product of A and N generated by multiplier 242 is transferred to the second input of subtractor 244, where A is the largest power of two integer that when multiplied by the value of N results in a product having a value that is less than the new value of $P_{SHIFTED}$. A difference value ($P_{SHIFTED}$–A*N) is generated by subtractor 244 for the desired value ($R^2$ mod N).

An alternative method of determining the value ($R^2$ mod N) involves selecting a value of R having a value such as $_{(2)}2$, where "n" is an integer number. In other words, R is selected to have values such as $2^2, 2^4, 2^8, \ldots, 2^{256,}$ and the like. In binary representation the value for R has a logic one for the most significant data bit followed by a string of zeros. The most significant data bit of the binary value of N, i.e., the left most logic one bit location of N, is aligned with the logic zero value that is adjacent to the logic one in the value of R. The aligned value of N, $N_{ALIGNED,}$ is subtracted from R to provide a difference value for R–$N_{ALIGNED.}$ The step of aligning the left most logic one for the value of N to the logic zero value that is adjacent to the most significant data bit having a logic one value in the difference value is repeated until the value (R mod N) is generated. Put another way, a difference value that has a value that is less than the value of N is equivalent to the value (R mod N).

By shifting the value (R mod N) left one bit position and subtracting, if needed, the value of N from the value (R mod N), the value (2R mod N) is generated. The value (2R mod N) is used for both of the operands A and B of multiplier 56 (see FIG. 3) to generate the value ($2^2$R mod N) at the output of co-processor 44. The newly generated value ($2^2$R mod N) is used for both of the operands A and B of multiplier 56 to generate the value ($2^4$R mod N) at the output of co-processor 44. The newly generated value from co-processor 44 is repeatedly used as the value for both of the operands A and B in generating a new value until the new value has $_{(2)}2^n$R mod N), where $_{(2)}2^n$ is equivalent to the value of R. Thus, the value ($R^2$ mod N) has been generated.

By now it should be appreciated that the present invention provides a cryptographic multiplication system that achieves high performance, low cost, and low-power for implementation in an integrated circuit. The Foster-Montgomery Hardware Accelerator achieves high performance by computing the Foster-Montgomery Reduction Algorithm and performing the multiplication of large operands in fewer clock cycles that in prior art systems. The methods and circuitry are adaptable to operands having an increased number of bits.

What is claimed is:

1. A data processing system for performing modulo multiplication, comprising:
   a multiplier having inputs for receiving binary data values A and B;
   an adder having a first input coupled to an output of the multiplier, a second input coupled for receiving a partial product, and an output for supplying a summed value; and
   a modulo reducer having a first input coupled to the output of the adder, a second input coupled for receiving a binary data value N, and an output for supplying a data value having a form of (A*B/R mod N), wherein a least significant data bit of a reduction value $\mu$ is generated by aligning the binary data value N and adding the binary data value N to the summed value when a predetermined bit location of the summed value has a first logic state.

2. The data processing system of claim 1, wherein the partial product is initially zero and the predetermined bit location of the summed value is a least significant bit of the summed value.

3. The data processing system of claim 1, wherein the data value is reduced to a zero value all bits of the reduction value $\mu$ are determined.

4. A smartcard, comprising:
   a data bus for transferring data to an output of the smartcard; and
   a co-processor coupled to the data bus for multiplying a first digit (A*R mod N) and a second digit (B*R mod N) and generating a product of (A*B*R mod N) which is reduced modulo N by dividing by a value of R during multiplication, where A and B are integer values, N is a modulo count and an odd integer value, R is an integer value, and the modulo multiplication is based on a value ($\mu$*N), where $\mu$ is determined when multiplying the first and second digits.

5. The smartcard of claim 4, wherein the co-processor comprises:
   a multiplier coupled to the data bus for receiving the data, wherein the data includes a first operand received at a first input of the multiplier and a second operand received at a second input of the multiplier, and wherein the multiplier generates a product from the first and second operands;
   a summer circuit having a first input coupled to the multiplier for receiving the product, a second input coupled for receiving a previous partial product, and an output for providing a sum of the product and the previous partial product; and
   a modulo reducer having a first input coupled to the output of the summer circuit, a second input coupled for receiving the binary value N, and an output that supplies a reduced product, wherein the reduced product has an even value.

6. The smartcard of claim 5, further including a digit negation unit having an input coupled to the data bus for receiving the first operand and an output coupled to the first input of the multiplier for supplying a two's complement negative number of the first operand.

7. The smartcard of claim 5, further including a memory having an input coupled to the output of the modulo reducer for receiving the reduced product and an output coupled to the second input of the summer circuit.

8. The smartcard of claim 4, wherein the binary value N has an odd value.

9. A cryptographic system, comprising:
   a central processing unit having a data bus for transferring data; and
   a cryptographic accelerator block coupled to the data bus for multiplying a first digit (A*R mod N) and a second digit (B*R mod N) and generating a product (A*B*R mod N) which is reduced modulo N by dividing by a value of R during multiplication of the first and second digits, where A and B are integer values, N is a modulo count and an odd integer value, R is an integer value, and the modulo multiplication is based on a value ($\mu$*N), where $\mu$ is determined when multiplying the first and second digits.

10. The cryptographic system of claim 9, wherein the cryptographic accelerator block comprises:
   a multiplier coupled to the data bus for receiving the data, wherein the data includes a first value received at a first input of the multiplier and a second value received at a second input of the multiplier, and wherein the multiplier generates a product from the first and second values;
   a summer circuit having a first input coupled to an output of the multiplier and a second input coupled for receiving a previous partial product, and an output for providing a sum of the product and the previous partial product; and
   a modulo reducer having a first input coupled to the output of the summer circuit, a second input coupled for receiving the integer N, and an output that supplies a reduced product.

11. The cryptographic system of claim 10, further including a memory having an input coupled to the output of the modulo reducer and an output coupled to the second input of the summer circuit.

12. The cryptographic system of claim 10, further including a digit negation unit having an input coupled to the data bus for receiving the first value and an output coupled to the first input of the multiplier for supplying a two's complement negative number of the first value.

13. A cryptographic circuit, comprising:
   a multiplier having first and second inputs coupled for receiving operands A and B, respectively, and an output for supplying a partial product;
   an adder having a first input coupled to the output of the multiplier, a second input coupled for receiving a previous reduced partial product, and an output for supplying a summed value; and
   a modulo reducer having a first input coupled to the output of the adder, a second input coupled for receiving a modulus, and an output for supplying a reduced partial product.

14. The cryptographic circuit of claim 13, further comprising:
   a data bus for transferring data;
   a first memory coupled to the data bus, wherein the first memory stores the operands A and B;

a second memory having a first input coupled to the data bus and a second input coupled for receiving the reduced partial product, wherein the second memory stores the reduced partial product and provides the previous reduced partial product; and a third memory having a first input coupled to the data bus and a second input coupled to the second input of the modulo reducer, wherein the third memory stores the modulus.

15. The cryptographic circuit of claim 14, further comprising:

a Digit Negation Unit (DNU) having an input coupled to the data bus for receiving operand A from the first memory and an output coupled to the first input of the multiplier;

a Data Switch Unit (DSU) having a first input coupled to an output of the second memory, a second input coupled to the data bus, and an output coupled to the second input of the adder for supplying the previous reduced partial product; and a Digit Compare Unit (DCU) having a first input coupled to an output of the third memory, a second input coupled to the data bus, and an output coupled to the second input of the modulo reducer for supplying the modulus.

16. A method of multiplying two operands, comprising the steps of:

multiplying a first operand A and a second operand B to provide a product;

adding a partial product to the product to provide a summed value; and adding an integer binary value N to the summed value when a particular data bit location of the summed value has a first logic value.

17. The method of claim 16, wherein the step of multiplying a first operand A and a second operand B include multiplying the first operand A having a form (A*R mod N) and the second operand B having a form (B*R mod N), where R is an integer binary value.

18. The method of claim 16, wherein the particular data bit location of the summed value is a least significant data bit when the partial product has a value of zero.

* * * * *